E. GINDRE.
ELECTRICAL CONNECTION.
APPLICATION FILED NOV. 11, 1912.
1,122,495.
Patented Dec. 29, 1914.
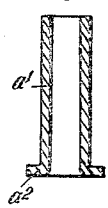
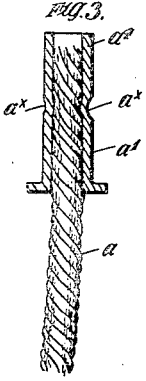
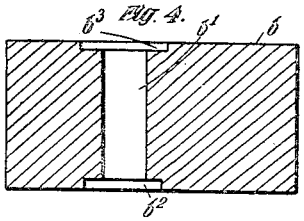
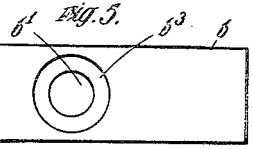
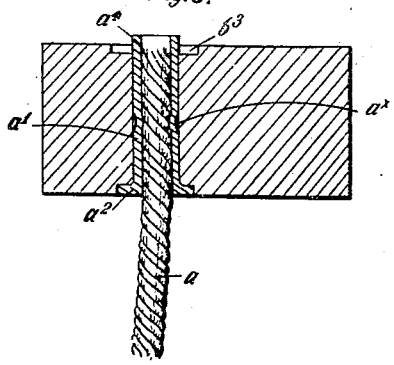
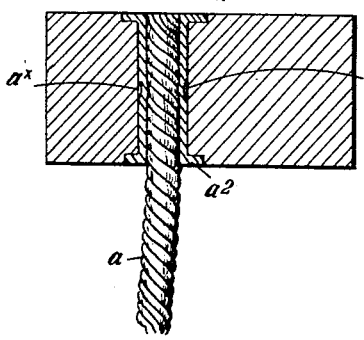
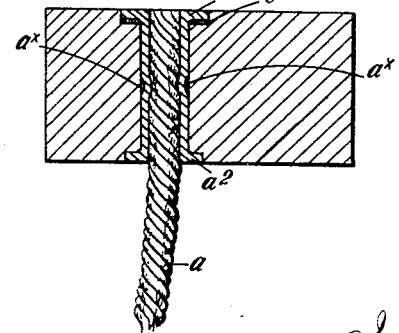

UNITED STATES PATENT OFFICE.

EUGÈNE GINDRE, OF PARIS, FRANCE, ASSIGNOR TO SOCIETE ANONYME LE CARBONE, OF LEVALLOIS-PERRET, NEAR PARIS, FRANCE.

ELECTRICAL CONNECTION.

1,122,495.  Specification of Letters Patent.  Patented Dec. 29, 1914.

Application filed November 11, 1912. Serial No. 730,782.

*To all whom it may concern:*

Be it known that I, EUGENE GINDRE, a citizen of the French Republic, residing at 18 Rue de Berlin, Paris, in the French Republic, have invented certain new and useful Improvements in or Relating to Electrical Connections, of which the following is a specification.

This invention relates to electrical connections particularly applicable for employment with the flexible conductors or cables ordinarily used with the collectors or brushes of motors and similar electrical machines; the object being to provide a practical and economical method which insures a strong connection between the conductors and the brushes with a minimum of electrical resistance.

According to this invention the conductor or cable is fixed in a metal tube, ferrule or bush which is firmly clamped to the brush by means of collars or flanges pertaining to or produced from the said tube. The conductor may be detachably mounted or secured in the tube or ferrule. The improved method of connection may be accomplished in various ways but the methods hereinafter described are adapted to give satisfactory results.

In order that the said invention may be clearly understood and readily carried into effect I will proceed to describe the same more fully with reference to the accompanying drawing in which:

Figure 1 is a sectional view of the tube or bush in which the flexible conductor or cable is secured. Fig. 2 is a plan of the tube or bush. Fig. 3 shows the tube applied to the end of a flexible conductor or cable. Fig. 4 is a sectional view of a brush or collector for a motor or other electrical machine. Fig. 5 is a plan of said brush. Fig. 6 is a sectional view of the brush showing the tube and cable end inserted in the opening therein. Fig. 7 is a similar view showing the tube and cable end secured to the brush. Fig. 8 is a similar view of a modified arrangement of the improved connecting means.

$a$ is the cable or conductor and the extremity thereof is connected to the brush $b$ by means of a tube, ferrule or bush $a'$ The cable or conductor $a$ is secured in the tube $a'$ in such a manner as to obtain intimate contact and to this end the tube is punched or indented either at intervals as at $a^x$, Fig. 3, or continuously about the circumference so as to present a constricted bore the materal of the tube at the restricted part presenting a waist like appearance, and entering and gripping the cable or conductor $a$. The tube $a'$ is formed with flanges $a^2$, $a^3$ Fig. 7, one of which $a^2$ is initially produced when making the tube, the other $a^3$ being produced after the cable or conductor $a$ has been secured in the tube and the latter inserted in a hole $b'$ formed for its reception in the brush $b$. This latter flange $a^3$ may conveniently be formed by means of a suitable tool such as a tube expanding and flanging tool. The bore of the hole $b'$ in the brush $b$ corresponds with the outer diameter of the tube $a'$ and the end portions of the hole are rabbeted and adapted to receive the flanges $a^2$, $a^3$ pertaining to the tube $a'$. Thus the flanges $a^2$, $a^3$ are housed in counter sunk recesses $b^2$, $b^3$ formed at the extremities of the hole $b'$ in the brush. It will be apparent that according to this construction the tube $a'$ is required to be of sufficient length to admit of the unflanged extremity $a^3$ thereof being turned over to form the flange $a^3$ and engage with the rabbeted or counter sunk end $b^3$ of the hole $b'$ in the brush.

By the above described method, it is possible to clamp the brush $b$ firmly and effectively between the flanges $a^2$, $a^3$ pertaining to the tube $a'$ and consequently to obtain a good contact, the connection being of considerable strength and obtainable in an economical manner.

If desired in certain cases a metal washer may be employed in conjunction with the end flanges of the tube, ferrule or bush $a'$, such an arrangement is shown in Fig. 8. The washer $c$ is shown interposed between the flange or collar $a^3$ which is produced after the tube $a'$ having the cable or conductor fitted therein is in position in the brush. It will be understood however that a similar washer could be placed under the flange $a^2$. The arrangement has the effect of increasing the contact surface between the metal part of the connection and the brush and serves to diminish the electric resistance. The same result may be obtained by coating the flanges or collars $a^2$, $a^3$ or the counter sunk recesses $b^2$ $b^3$ with copper, metal, tin, silver, or other suitable metal.

The tube $a'$ may, if desired, be screw threaded internally for the reception of a correspondingly screw threaded rod or end attached to or carried by the cable or conductor $a$. Such an arrangement enables the cable or conductor to be readily connected or disconnected from the brush when required.

The invention is applicable for use with various forms or constructions of brushes and cables or conductors, and although in the above description certain forms have been defined it will be apparent that variations may be made in the application and arrangement of the invention without departing from the essential features or principles thereof.

What I claim and desire to secure by Letters Patent of the United States is:—

1. The combination with a brush or collector for motors and similar electrical machines of a metallic tube secured in the aperture of the said brush and a conductor held in the said tube by compression.

2. The combination with a brush or collector for motors and similar electrical machines of a metallic tube secured in the aperture of the said brush and a flexible conductor held axially in the interior of the said tube by compression.

3. The combination with a brush or collector for motors and similar electrical machines of a metallic tube, end flanges for securing said tube in the aperture of the said brush and a flexible conductor held axially in the interior of the said tube by compression.

In testimony wherof I affix my signature in presence of two witnesses.

EUGÈNE GINDRE.

Witnesses:
  HANSON C. COXE,
  ENRIQUE BAER.